June 30, 1931.  S. HAMMER  1,812,403
MIRROR AND METHOD OF FRAMING THE SAME
Filed Jan. 23, 1930  2 Sheets-Sheet 1

INVENTOR
Samuel Hammer
BY
his ATTORNEY

June 30, 1931. S. HAMMER 1,812,403

MIRROR AND METHOD OF FRAMING THE SAME

Filed Jan. 23, 1930 2 Sheets-Sheet 2

INVENTOR
Samuel Hammer
BY C. P. Goepel
his ATTORNEY

Patented June 30, 1931

1,812,403

UNITED STATES PATENT OFFICE

SAMUEL HAMMER, OF BROOKLYN, NEW YORK, ASSIGNOR TO UNITED METAL BOX CO. INC., OF BROOKLYN, NEW YORK, A CORPORATION OF NEW YORK

MIRROR AND METHOD OF FRAMING THE SAME

Application filed January 23, 1930. Serial No. 422,779.

This invention relates to mirrors and a method of framing the same, and has for its general object and purpose to provide a very simple and inexpensive means and method of providing the mirror glass with a marginal metallic frame whereby an adequate and substantial support for the heavy glass is obtained, while at the same time, liability of chipping, cracking or breaking the glass incident to vibratory shocks or jars in the handling or shipment of such mirrors, is largely obviated or reduced to a minimum.

It is an important object of my present invention to provide a one piece marginal frame for the mirror glass which is of such construction that the mirror, together with a resiliently compressible and expansible backing sheet may be readily mounted in said frame. I also provide a simple means for easily and quickly fixing the parts of the mirror frame in definitely established relation to each other and to the edges of the mirror glass, and said backing material expanding to yieldingly press the edges of the glass against inwardly extending front flanges of the frame.

It is also a particular object of my invention to provide a framed mirror of that type which is adapted to be utilized and applied as a hinged door for a medicine cabinet or other analogous structure and wherein the mirror frame consists of a continuous channel shaped sheet metal strip, the ends of which are brought together in abutting contact at the lower edge of the mirror glass and rigidly connected with each other by a part embracing said frame ends and having a conveniently located finger-engaging flange, whereby the door may be readily unlatched and swung to its open position.

It is a further general object of my invention to provide a very simple and attractive mirror frame, together with an improved method of mounting or framing the mirror which will enable articles of this kind to be manufactured on a quantity production basis, at considerably less cost than is possible in the case of mirror structures and production methods as now known in the art.

With the above and other objects in view, the invention consists in the improved mirror and method of framing the same, as will be hereinafter more fully described, illustrated in the accompanying drawings, and subsequently incorporated in the subjoined claims.

In the drawings, wherein I have disclosed one simple and practical embodiment of my present invention, and in which similar reference characters designate corresponding parts throughout the several views,—

Figure 1:
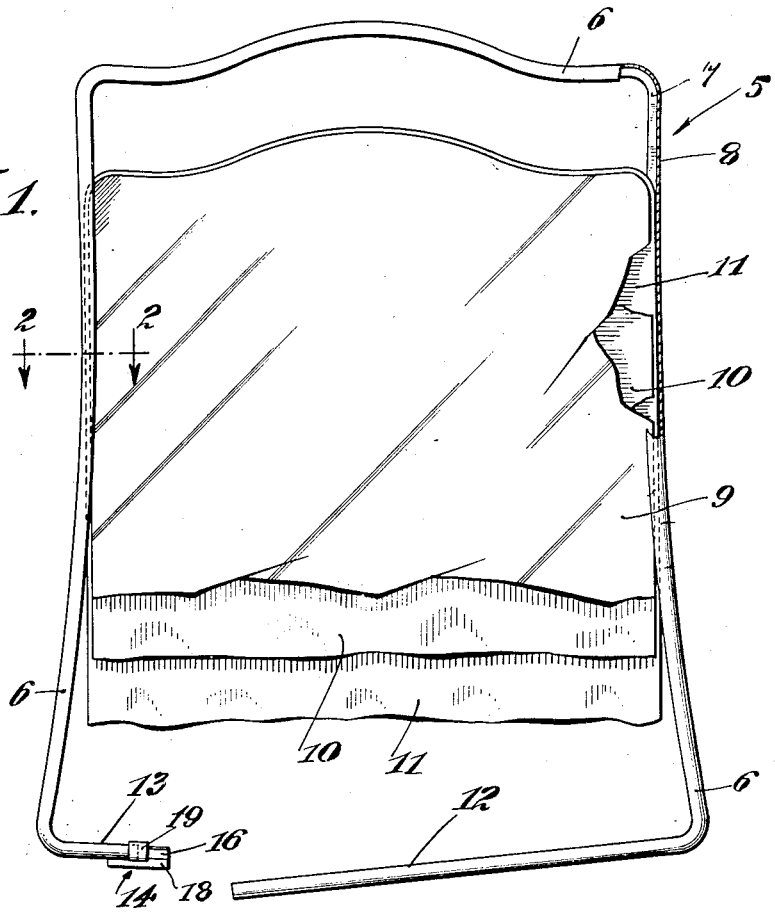
Figure 1 is a front face view partly in section, illustrating the manner of assembling the mirror glass and parts associated therewith within the one piece channel shaped frame strip.
Figure 2:
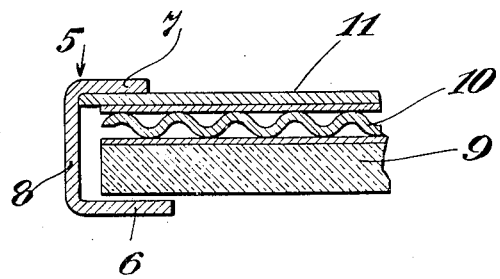
Fig. 2 is a fragmentary transverse section on an enlarged scale taken on the line 2—2 of Fig. 1.
Figure 3:
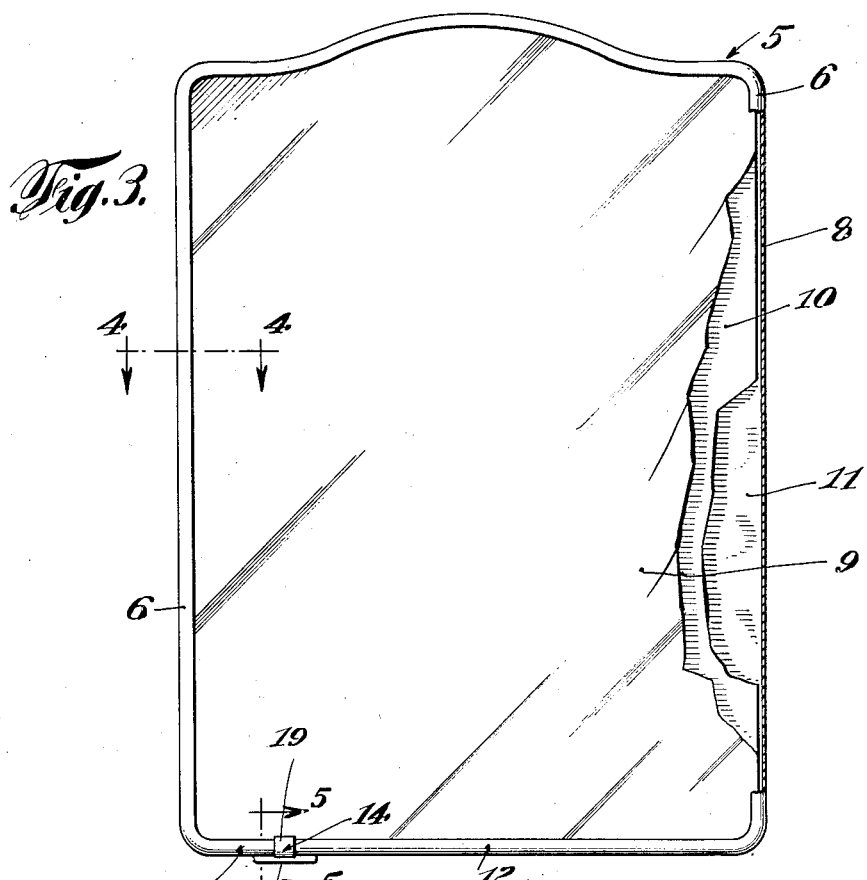
Fig. 3 is a front elevation partly in section showing the several parts as finally assembled and secured in permanently fixed relation to each other within the marginal frame.

Referring now in detail to the drawings, and for the present more particularly to Fig. 1 thereof, 5 generally indicates the ornamental frame within which the mirror glass and backing parts associated therewith are adapted to be mounted. In the preferred embodiment of my invention, this frame strip is formed from a single length of sheet steel of the requisite gauge which is bent into channel shape form in cross section to provide front and rear flanges 6 and 7 respectively, connected by the base wall 8 of the channel. This channel shaped metal strip is transversely bent at suitable points so that when the ends of the strip are brought together in abutting contact and secured against separation, there will be provided in effect a continuous frame of a predetermined ornamental configuration with the frame channel opening inwardly. It is to be noted that the front flanges 6 of the several parts of the frame strip are of appreciably greater width than the rear flanges 7 thereof. Also, as will be observed from reference to Fig. 1 of the drawings in this embodiment of the invention, the opposite longitudinal side portions of the frame 5 are slightly bent or curved inwardly from end to end thereof in the normal condition of said frame and before the ends of the frame strip are joined to each other.

The mirror glass shown at 9, in its outline shape or contour corresponds to the shape of the frame 5. Upon the rear side of the mirror glass, a sheet of corrugated cardboard or other packing material as shown at 10 is adapted to be superimposed, the dimensions of said packing sheet substantially corresponding to the dimensions of the mirror. Upon this packing sheet, the backing plate 11 of thin sheet steel is then placed, said steel sheet being of somewhat greater dimensions than the compressible packing sheet 10 and the mirror 9 so that the marginal edges of the backing plate project beyond the edges of the mirror and the packing sheet 10. By any suitable means pressure is applied in opposite directions against the mirror 9 and the backing plate 11 to compress the corrugated sheet 10 therebetween. While maintaining the packing sheet under such compression, the upper end of the mirror, together with the parts associated therewith is then inserted into the channels of the opposite side portions of the frame 5. This engagement of the parts within said channels may be readily made by spreading the yieldable side portions of the frame outwardly away from each other. With the frame in its normal form, the width of the backing plate 11 is substantially equal throughout the length thereof to the distance between the base walls 8 of the frame channels at one end of the frame. Thus, as noted, it is necessary to spread these opposite side portions of the frame slightly in order that the end of the mirror and the assembled backing parts may be inserted between the opposite side portions of the frame at the approximate center thereof. These assembled parts with the packing sheet 10 held under compression are then moved longitudinally of the frame within the side channels until the upper ends of said parts are positioned within the top channel of the frame. When so positioned, the lower ends of the side portions of the frame 5 will extend outwardly in divergent relation to the side edges of the mirror, somewhat as indicated in Fig. 1 of the drawings. These ends of the side parts of the frame are then pressed inwardly so that the backing plate 11 will extend throughout its longitudinal side edges in contact with the base walls 8 of the side portions of the marginal frame. Thus, these side portions of the frame will then extend along straight parallel lines at opposite edges of the mirror glass and will be placed under a certain tension.

Preferably, a long bottom or lower end section 12 of the frame strip extends inwardly from one of the vertical side parts of the frame and a comparatively short section 13 extends inwardly from the other side of the frame. As the frame sides are pressed into contact with the edges of the metal backing sheet 11, the extremities of these lower end or bottom sections 12 and 13 of the frame are brought into abutting contact in alignment with each other. In one embodiment of the invention, I provide a combined connecting member and finger piece indicated at 14 which consists of a sheet metal stamping having an intermediate part 15 with a flange 16 extending substantially at right angles to one edge thereof and terminating in an inwardly projecting longitudinal lip 17. At the opposite edge of the part 15, the metal is folded upon itself to provide the angularly projecting finger engaging flange 18 which is centrally formed with a relatively narrow offset tongue 19 terminating in an inwardly projecting lip 20. The part 15 of said member adjacent each end thereof is provided with a screw receiving opening indicated at 21. The base walls 8 of the bottom sections 12 and 13 of the mirror frame, adjacent their free ends are each provided with a threaded opening indicated at 22.

As shown in Fig. 1 of the drawings, before assembly of the mirror glass and associated parts within the channeled frame strip, the member 14 is arranged at one of its ends upon the lower end section 13 of the frame, the intermediate part 15 of said member being engaged against the face of the channel wall 8 and the flange 16 extending upwardly over the rear flange 7, with the lip 17 projecting over the edge of said frame flange for contact with the metal back plate 11. The tongue 19 extends upwardly over the outer side of the front flange 6 of the frame, with its lip projecting inwardly over the edge of said flange, one half of the width of the tongue 19 extending beyond the end of the frame section 13. Thus, when the two lower end sections 12 and 13 of the frame are brought together as above explained, the end of the section 12 is fitted within the lip 17 and upon the part 16 of said connecting member. With said end sections of the frame in abutting engagement, the member 14 is properly positioned to register the openings 21 thereof with the threaded openings 22, and screws such as that indicated at 23 are then inserted. Thus, the abutting ends of the frame strip are securely held together against separation, and the connecting member 14 provides the finger piece or flange 18 extending downwardly from the frame at a point adjacent the front flange 6 thereof where it may be easily grasped for the purpose of swinging the hinged door mirror to an open position. The attachment is amply secure to enable the necessary pressure to be applied against the finger piece 18 to release the ordinary spring latch with which such cabinet doors are provided, it being unnecessary to secure to the free edge of the door, a knob or other additional hand piece for this purpose.

Figure 4:
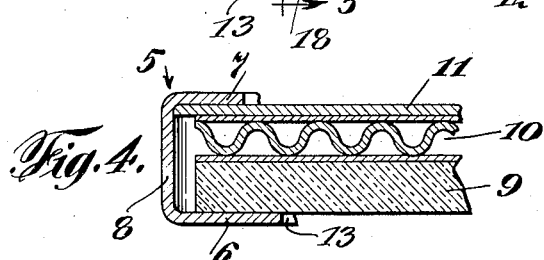
Fig. 4 is a transverse sectional view on an enlarged scale taken on the line 4—4 of Fig. 3.
Figure 5:
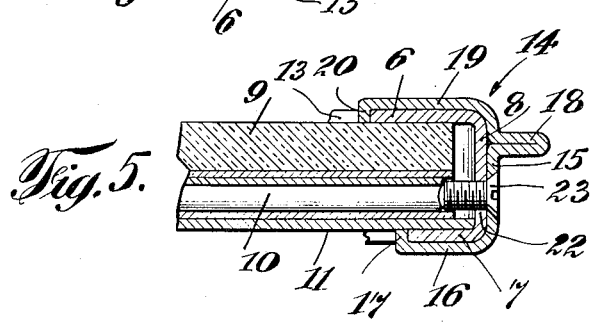
Fig. 5 is a similar sectional view taken on the line 5—5 of Fig. 3.
Figure 6:
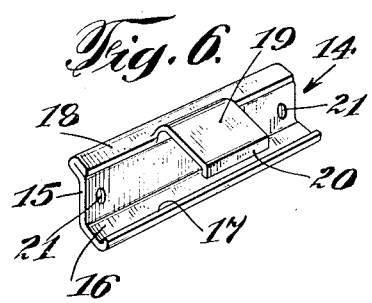
Fig. 6 is a detail perspective view illustrating the combined ornamental connecting member between the ends of the frame strip and finger piece or lug.

By providing the mirror frame of the construction above described and assembling the mirror and its associated parts within said frame in the manner stated, it will be apparent that when the compressing pressure upon the resilient packing sheet 10 is released, the said sheet will expand to its normal position and yieldably urge the front surface of the mirror glass at its marginal edges into uniform frictional contact against the inner surface of the front flange 6 of the frame strip as shown in Fig. 4 of the drawings, while the edges of the back plate 11 are in a similar manner forced rearwardly and frictionally held in contact with the inner side of the rear flange 7 of the frame. As the edges of the glass 9 are spaced from the base wall 8 of the frame channel, it is therefore, apparent that the glass is yieldably and frictionally confined at its marginal edges within said channel. Therefore, such shocks or vibrations to which the framed mirror might be subjected in handling or in shipment will be yieldably cushioned, and possible chipping or cracking of the mirror glass at its edges is reduced to a minimum. From reference to Fig. 5 of the drawings, it will be observed that the attaching screws 23 for the member 14 are located in alignment with the packing sheet 10 so that these screws cannot, by any possibility come into contact with the edges of the glass. In this manner, it will be appreciated that I have succeeded in producing a novel form of frame structure for such mirrors together with an improved mounting of the mirror glass and a method of framing such mirrors whereby the assemblage of the parts may be greatly expedited to materially facilitate rapid production and a corresponding decrease in manufacturing cost. Obviously, the particular form or shape of the mirror glass and its frame as shown in the drawings, is merely one of an infinite number of ornamental configurations which might be selected. Also, while I preferably provide the member 14 whereby the ends of the one piece channel strip frame are connected, it will be evident that this member likewise might be made in various other ornamental shapes or forms.

By the elimination of additional mechanical fastening or securing means for holding the mirror glass in proper position in the frame, I avoid visible external projections either upon the face of the mirror or of the frame, which would more or less detract from the esthetic appearance of the frame and mirror. Nevertheless, I retain the very desirable feature of permitting of a certain relative yielding between the frame and the mirror to thereby insure the protection of the mirror against accidental breakage.

I have herein shown and described a preferred practical embodiment of the several novel features of my present disclosure. As above indicated however, such disclosure is susceptible of incorporation in various other alternative mechanical structures, and I therefore, reserve the privilege of resorting to all such legitimate changes therein as may be fairly embodied within the spirit and scope of the invention as claimed.

I claim:

1. A method of framing mirrors which consists in first bending a channel shaped metal strip to form a frame with the channel opening on the inner side thereof and unconnected end sections of the strip extending inwardly from the opposite sides of the frame, then assembling a mirror with a back plate and a sheet of packing material interposed between said plate and the mirror, then while holding the backing material under compression inserting one end and the opposite side edges of the back plate and mirror into the channels of said frame, then bending the opposite sides of the frame inwardly to position said end sections thereof in alignment and engage the other end of the mirror assembly within the channels of said end sections, then rigidly securing said aligned end sections of the strip to each other, and finally releasing the compressing pressure on the mirror assemblage to permit expansion of said yieldable packing material whereby the backing plate and the mirror are urged in opposite directions into frictional contact with the rear and front flanges respectively of the mirror frame.

2. An article of the character described including, a mirror, a frame for said mirror consisting of a single channel shaped metal strip having the channel thereof opening inwardly to receive the marginal edges of the mirror, and said frame having the opposite side portions at one end normally diverging laterally away from each other, and end sections of the strip extending inwardly therefrom and adapted to be disposed in alignment by forcing the divergent side portions of the frame strip into substantially parallel relation and placing the same under tension, and means for rigidly connecting said aligned end sections of the strip to each other.

3. An article of the character described including a frame consisting of a single channel shaped metal strip having the channel thereof opening inwardly and end portions of the strip projecting inwardly from the opposite sides thereof, a mirror glass, a backing plate for said glass of greater dimensions than the latter to project beyond the marginal edges thereof, a sheet of yieldable packing material interposed between the backing plate and the mirror glass and of substantially the same dimensions as the latter, said mirror glass and the assembled backing adapted to be inserted into the channels of the frame while said material is under compression, and said end sections of the frame adapted to be brought into alignment with each other whereby the base walls of the frame channels are brought into contact with the edges of the backing plate and spaced from the edges of the mirror glass, said packing material adapted to urge the backing plate and the mirror glass in opposite directions into frictional contact with the rear and front flanges of the frame respectively, and means rigidly connecting the aligned end sections of the frame to each other.

4. An article of the character described including a mirror, a frame for said mirror consisting of a single channel shaped metal strip having the channel thereof opening inwardly to receive the marginal edges of the mirror, and said frame having the opposite side portions thereof longitudinally bowed inwardly towards each other, and end sections of the strip extending inwardly therefrom and adapted to be disposed in alignment by forcing said curved side portions of the frame strip into substantially parallel relation and placing the same under tension, and means for rigidly connecting said aligned end sections of the strip to each other.

In testimony that I claim the foregoing as my invention, I have signed my name hereto.

SAMUEL HAMMER.